US008733842B2

(12) United States Patent
Sakkinen et al.

(10) Patent No.: US 8,733,842 B2
(45) Date of Patent: May 27, 2014

(54) TAILOR WELDED SEAT AND COMPONENTS

(75) Inventors: Daniel J. Sakkinen, Highland, MI (US); Michael J. Thomas, Ann Arbor, MI (US); Kurt A. Seibold, Whitmore Lake, MI (US); John David Kotre, Ann Arbor, MI (US); Christopher P. Kubacki, Ann Arbor, MI (US); Mark A. Harris, West Bloomfield, MI (US)

(73) Assignee: Johnson Controls Technology Company, Holland, MI (US)

( * ) Notice: Subject to any disclaimer, the term of this patent is extended or adjusted under 35 U.S.C. 154(b) by 465 days.

(21) Appl. No.: 12/597,292

(22) PCT Filed: Apr. 18, 2008

(86) PCT No.: PCT/US2008/060834
§ 371 (c)(1),
(2), (4) Date: Apr. 30, 2010

(87) PCT Pub. No.: WO2008/131228
PCT Pub. Date: Oct. 30, 2008

(65) Prior Publication Data
US 2010/0219674 A1    Sep. 2, 2010

Related U.S. Application Data

(60) Provisional application No. 60/907,832, filed on Apr. 18, 2007.

(51) Int. Cl.
*B60N 2/68*    (2006.01)
(52) U.S. Cl.
USPC ..................................... 297/452.18

(58) Field of Classification Search
USPC ........................... 297/452.18, 452.2
See application file for complete search history.

(56) References Cited

U.S. PATENT DOCUMENTS

| | | | |
|---|---|---|---|
| 2,720,914 A * | 10/1955 | Doty et al. | 297/452.19 |
| 6,034,347 A | 3/2000 | Alber et al. | |
| 6,375,267 B1 * | 4/2002 | Ishikawa | 297/452.18 |
| 6,682,146 B2 | 1/2004 | Minai | |
| 7,866,689 B2 * | 1/2011 | Saberan | 280/730.2 |
| 2003/0067205 A1 * | 4/2003 | Eppert et al. | 297/463.1 |
| 2004/0113481 A1 * | 6/2004 | Saberan et al. | 297/452.18 |
| 2005/0082896 A1 | 4/2005 | Gupta et al. | |
| 2007/0035118 A1 | 2/2007 | Ni et al. | |

OTHER PUBLICATIONS

Patent Treaty Cooperation, Written Opinion of the International Searching Authority, PCT/US08/60834, Sep. 28, 2008.
Patent Treaty Cooperation, International Search Report, PCT/US08/60834, Nov. 3, 2008.

* cited by examiner

*Primary Examiner* — Milton Nelson, Jr.
(74) *Attorney, Agent, or Firm* — Bill C. Panagos; Linda D. Kennedy; Butzel Long

(57) ABSTRACT

A tailored vehicle seat component 12 having at least two portions with different properties that are joined together, such as by an adhesive or in a welding process (e.g., laser weld). These different properties include thickness, grades, surface finishes, coatings, and the like. The laser tailored welded vehicle seat 12 components may be incorporated into seat back frames 16, seat track assemblies 26, recliners 20, seat base frames 18, head restraints 88, cushion pans 132, and the like, to optimize manufacturing operations, mass, performance quality, and costs.

5 Claims, 14 Drawing Sheets

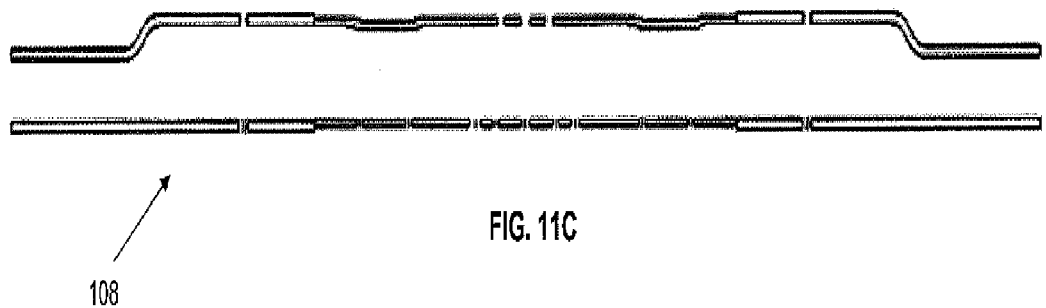
FIG. 11C
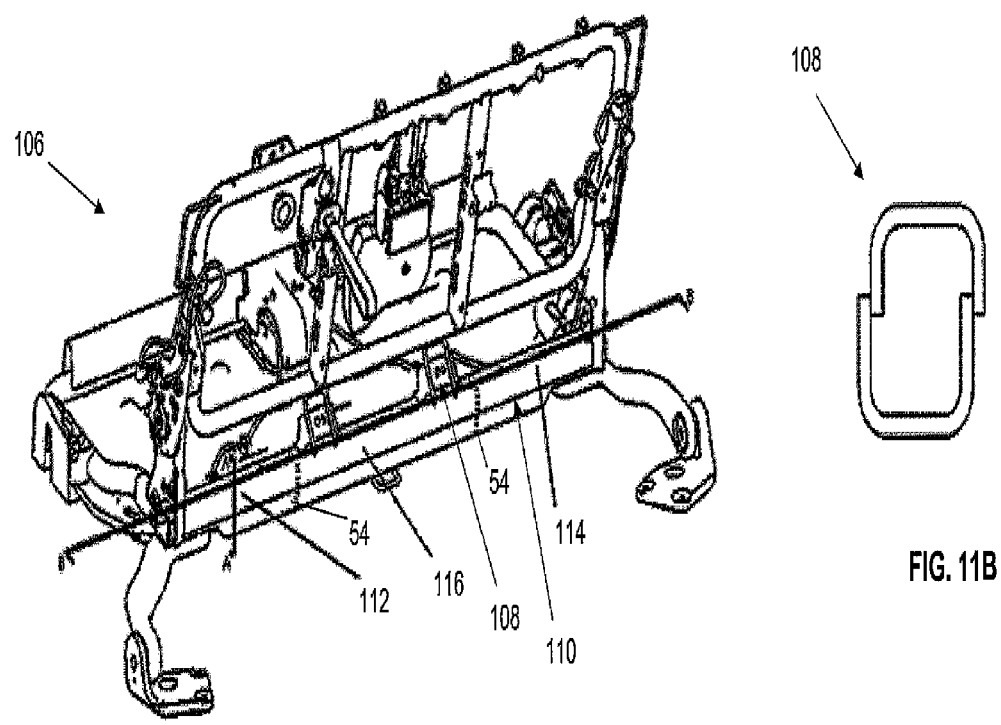
FIG. 11B
FIG. 11A

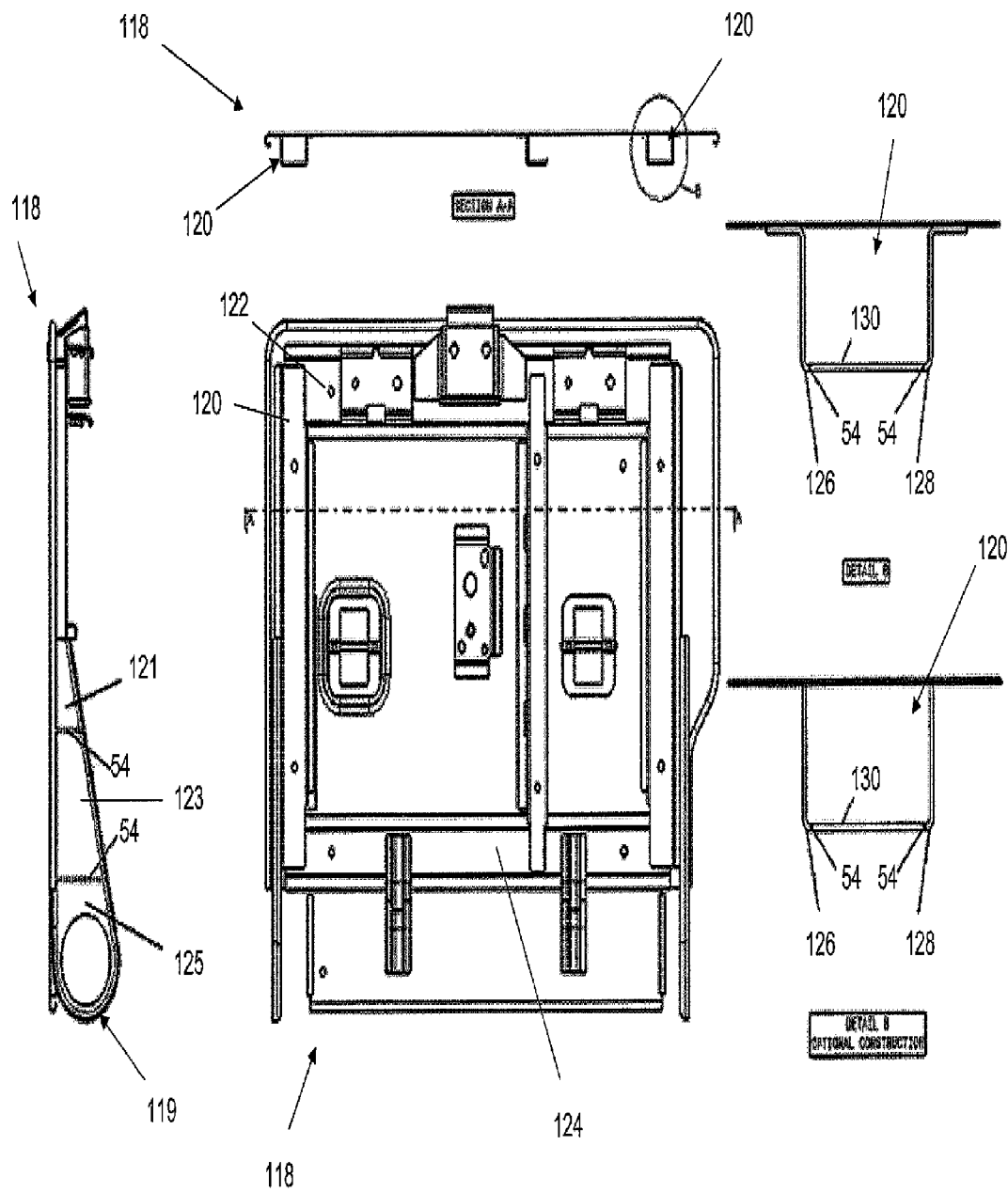

TAILOR WELDED SEAT AND COMPONENTS

CROSS-REFERENCE TO RELATED PATENT APPLICATIONS

This application claims the benefit of, and priority to, U.S. Provisional Patent Application No. 60/907,832, filed Apr. 18, 2007, which is incorporated by reference herein.

BACKGROUND

The present disclosure relates generally to the field of vehicle seating. More specifically, this disclosure relates to the use of tailor welded components included in a vehicle seat.

Laser tailor welding involves forming a component from two or more materials with different properties (e.g., thickness, grades, surface finishes, platings, coatings, etc.) to form a tailor welded blank (TWB), and then performing additional operations on the blank (e.g., forming, cutting, rolling, stamping, punching, etc.) to form the finished component. This technique may also be used to form a tailor welded coil (TWC) or a tailored welded tube (TWT). Unlike traditional components formed from a single material a having a single thickness, components formed from TWBs, TWCs, and TWTs may be engineered to provide a portion of the component having a greater thickness, different grade materials and/or a different geometry where needed, and provide portions with lesser thickness, lower grade materials and/or different structures to allow for reductions in mass, size, number of components, and/or cost over traditionally formed seat components and structures.

One exemplary laser tailor welding process includes two or more rolls of sheet metal (e.g., cold rolled steel, hot rolled steel, Zinc (Zn) coated steel, stainless steel or an alloy, etc.) that are joined together. The rolls are joined together with a continuous welding operation (e.g., a laser welding operation) to create a single piece of sheet metal.

Vehicle seat structures are generally optimized by selecting the material thickness and the material grade and then designing a monolithic component having a structurally advantaged shape.

SUMMARY

One exemplary embodiment relates to the manufacture and use of tailored seat components within vehicle seats. The tailored seat components are formed from TWBs, TWCs, and TWTs and include components such as a seat frame, a head support, a seat back, a seat cushion support, a seat cushion side member, a track assembly, a seat pan, and the like. The tailored seat component has at least two portions having different properties (e.g., thickness, grades, surface finishes, platings, coatings, etc.) that are welded together to optimize manufacturing operations, mass, performance, quality, and reduced cost. Another exemplary embodiment relates to a vehicle seat having a tube made from a TWB, TWC, or TWT and having a first portion having a first material and/or a first thickness and a second portion having a second material and/or a second thickness. In one alternate exemplary embodiment, the vehicle component is manufactured from a TWB, a TWC or a TWT having more than two portions and each portion has a different, material, a different thickness, and/or a different characteristic such that an optimized vehicle seat component may be manufactured for use in an optimized vehicle seat.

Another exemplary embodiment relates to a seat back to be used in a vehicle. The seat back is formed from a TWB, TWC or TWT and includes side members designed to include a top portion, middle portion and a lower portion. Each portion is constructed of metal or a metal composite having differing properties, such as strength and thickness to optimally manage forces directed to the seat back, such as operational, use and vehicle impact forces.

Another exemplary embodiment relates to a seat base to be used in a vehicle. The seat base is formed from a TWB or TWC and may include a side member or a side bracket having first and second end portions and a middle portion. Each portion is constructed of metal or a metal composite having differing properties, such as strength and thickness to optimally manage forces directed to the seat back.

Another exemplary embodiment relates to a recliner bracket for a seat frame to be used in a vehicle. The recliner bracket is formed from a TWB or TWC and is designed to controllably collapse under selected load conditions. This is accomplished via load limiting "fuses" or areas of where material has been removed from the recliner bracket. The recliner bracket is also designed to include first and second end portions and a middle portion. Each portion is constructed of metal (such as steel or an alloy) having differing properties, such as strength and thickness to optimally manage vehicle collision impact forces directed to the recliner bracket.

Another exemplary embodiment relates to a seat track assembly to be used in a vehicle. The seat track is at least partially formed from a TWB or TWC and includes an upper track, a lower track, and ball bearings. The upper track is designed to include a first and second end portion. Each portion is constructed of metal (steel or alloy) having differing properties, such as strength and thickness to provide improved bending resistance performance and improved track adjustment efforts.

Another exemplary embodiment relates to a head restraint for a seat to be used in a vehicle. The head restraint is formed from a TWB or TWC and is designed to have an upper head restraint portion and a first and second end portion. Each portion is constructed of metal (steel or alloy) having differing properties, such as strength and thickness to optimally manage vehicle collision impact forces directed to the head restraint.

The exemplary embodiments further relate to various features and combinations shown and described herein. Other ways in which the objects and features of the disclosed embodiments are accomplished will be described in the following specification or will become apparent to those skilled in the art.

BRIEF DESCRIPTION OF THE DRAWINGS

FIG. 11A is a rear perspective view of a rear bench seat having a bench seat tube formed from TWB, a TWC or a TWT with variable thicknesses and/or strengths according to one exemplary embodiment.

FIG. 11B is a front cross sectional view of the bench seat tube along the A-A line of the rear bench seat of FIG. 11A according to one exemplary embodiment.

FIG. 11C is a top cross sectional view of the bench seat tube along the B-B line of the rear bench seat of FIG. 11A according to one exemplary embodiment.

FIG. 12A is a rear view of a back panel including components formed from TWBs or TWCs with variable thicknesses and/or strengths according to an exemplary embodiment.

FIG. 12B is top cross sectional view of the back panel along the A-A line including components formed from TWB or TWCs with variable thicknesses and/or strengths according to an exemplary embodiment.

FIG. 12C is a side view of the back panel including components formed from TWBs or TWCs with variable thicknesses and/or strengths according to an exemplary embodiment.

DETAILED DESCRIPTION

Figure 1:
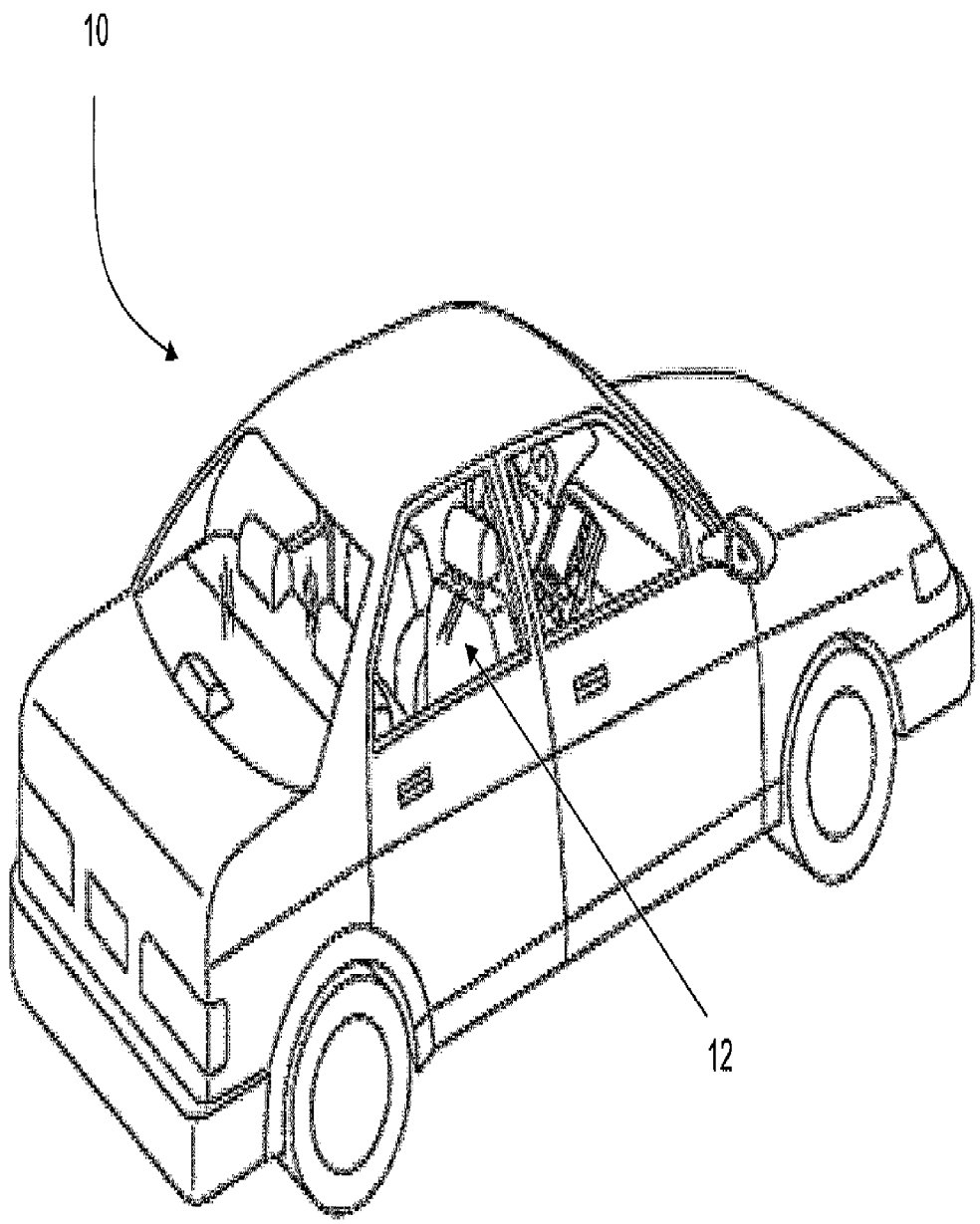
FIG. 1 is a perspective view of a vehicle with seats including components formed from TWBs, TWCs and/or TWTs according to an exemplary embodiment.
Figure 2:
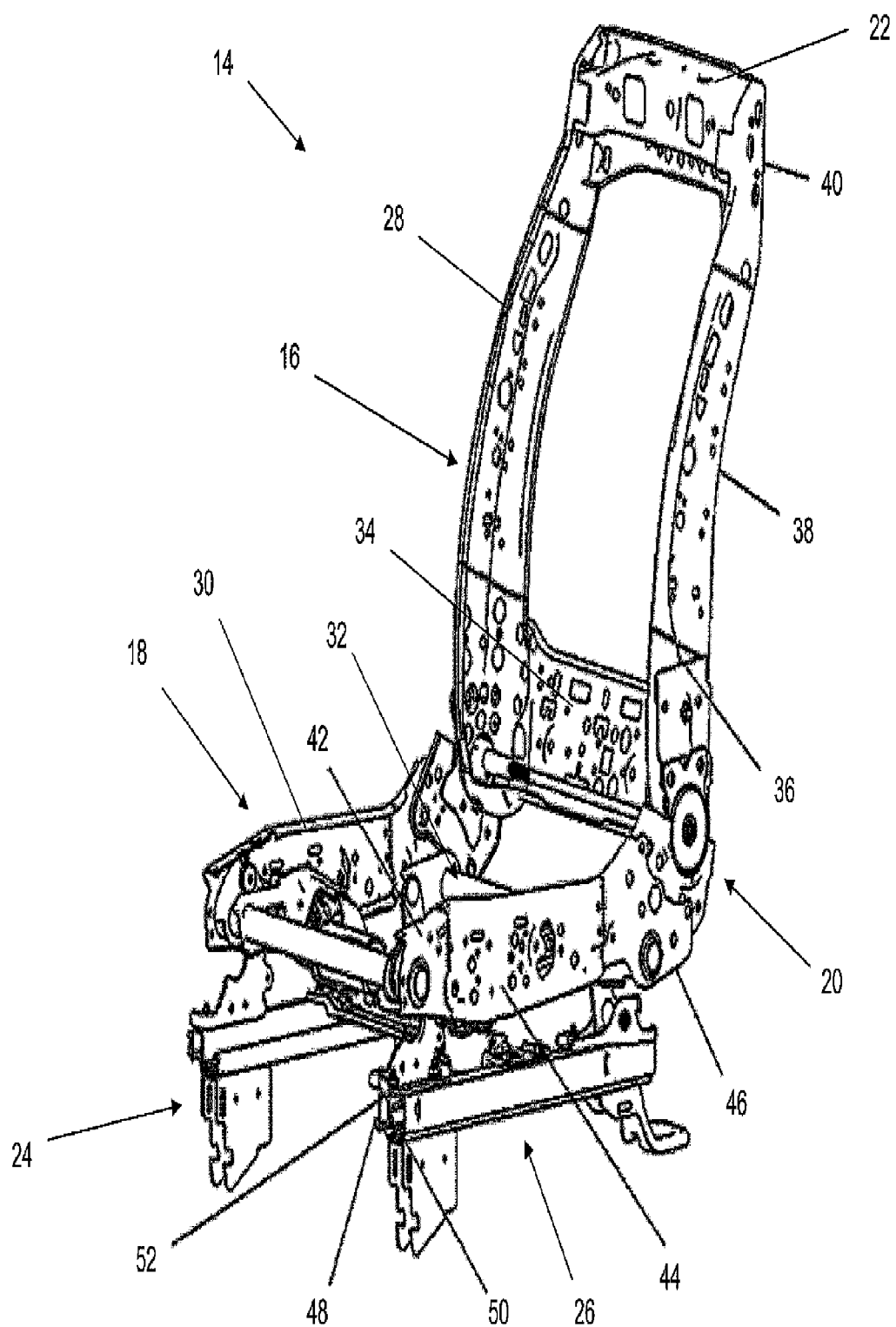
FIG. 2 is a perspective view of a frame for a vehicle seat including components formed from TWBs or TWCs.

Referring generally to the figures and in particular to FIG. 1, a vehicle 10 is shown according an exemplary embodiment. The vehicle 10 includes one or more vehicle seats 12 provided for an occupant of the vehicle 10. One exemplary embodiment of a vehicle seat structure 14 is shown in FIG. 2. While the vehicle 10 shown is a 4-door sedan, it should be understood that the seat 14 may be used in a mini-van, sport utility vehicle or any other means in or by which someone travels or something is carried or conveyed for any market or application including everything from office seating and transportation to planes and space travel and everything in between. The vehicle seat 14 shown includes a seat back 16, a seat base 18, and a connection member or recliner 20 coupled to the seat back 16 and the seat base 18. The vehicle seat 14 further may include a head restraint 88 and base portion 24. The head restraint 88 extends upward from the seat back 16 and is configured to restrain the head of an occupant during an impact. The base portion 24 (e.g. track assembly 26) couples the seat 14 to the vehicle body and may be configured to allow the seat to be selectively positioned (manually or motor driven) relative to the vehicle body.

As further shown in FIG. 2, the seat back frame 16 may include a first side member 28 and second side member 28 coupled together by an upper cross 22 member and lower cross member 34. The seat base frame 18 may include a first side member (or B-bracket) 30 and a second side member 44 coupled together by a tube 32 which may be a TWT. The seat back side member 28 may include a lower portion 36, a middle portion 38, an upper portion 40, and each portion may be formed from TWBs or TWCs with variable thicknesses and/or strengths, as will be discussed in greater detail below. The seat base side member 30 may include a first end 42, a middle portion 44, and a second end 46 formed from TWBs or TWCs with variable thicknesses and/or strengths, as will be discussed in greater detail below. The track assembly 26 may include a lower track 58 and an upper track 56 having a first end portion 48, a second end portion 50, and a middle portion 52 formed from TWBs or TWCs with variable thicknesses and/or strengths, as will be discussed in greater detail below.

Figures 3A, 3B, 3C:
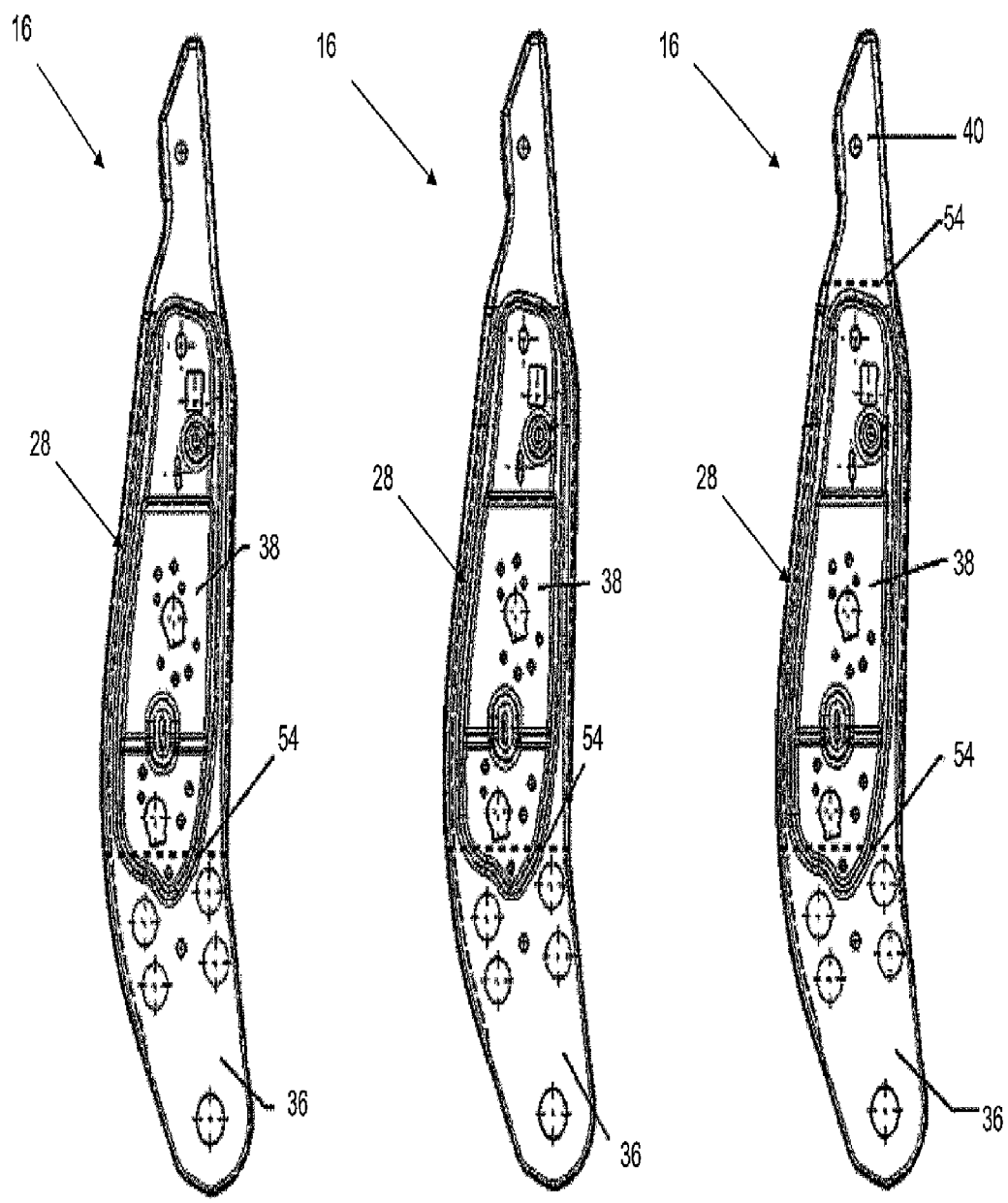
FIG. 3A is a side view of one of the side members for the seat back in FIG. 2 formed from a TWB or TWC with variable thicknesses and/or strengths according to an exemplary embodiment.
FIG. 3B is a side view of one of the side members for the seat back in FIG. 2 formed from a TWB or TWC with variable thicknesses and/or strengths according to another exemplary embodiment.
FIG. 3C is a side view of one of the side members for the seat back in FIG. 2 formed from a TWB or TWC with variable thicknesses and/or strengths according to another exemplary embodiment.

As shown in FIGS. 3A-3C the seat back may be manufactured using a TWB, TWC and/or TWT to help optimize (as in minimize) the weight of the seat back and is also preferably made to maximize the strength of the seat back to meet all performance requirements such as those that are applicable from the federal motor vehicle safety standards. The seat back is preferably made having a seat back side member 28 formed from a TWB or TWC that is stamped to form the side member 28 but may also be manufactured using any known or appropriate process such as stamping, forming, cutting, punching, etc. The side member 28 includes a lower portion 36 that is a higher strength and/or thicker metal to compensate for an increased bending moment applied to the lower portion 36; a middle portion 38 that is a lower cost metal (steel or alloy) that may be some thickness or grade different than the lower portion 36 and the upper portion 40; and an upper portion 40 that is a thinner, lower cost or higher formability metal (steel or alloy). The various portions of the side member 28 are coupled together via join seams 54. According to other exemplary embodiments, the TWB or TWC for the side member 28 may have only two portions or may have 4 or more portions.

TWBs or TWCs may be used to form other components for the seat frame that act as cantilever beams under certain loading conditions so that the component is stronger near the pivot point. For instance, in a rear seat with a 40/60 division, the two portions of the seat are coupled to the seat tracks on the outside edge and cantilevered over the space below the seat. Because of the seat geometry, the 60% portion forms a larger moment arm and has a larger bending moment about the bracket that couples it to the seat track. The 60% seat base may be formed from a TWB with an outside portion that is a higher strength and/or thicker metal (steel or alloy) to compensate for an increased bending moment applied to the outside portion.

Figure 4A:
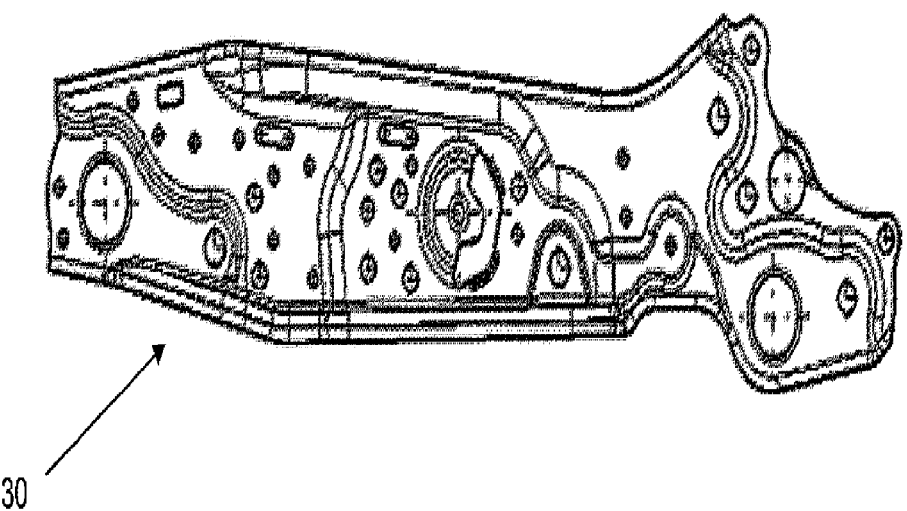
FIG. 4A is a side view of a monolithic side member for a vehicle seat base formed from a single material and single thickness.
Figure 4B:
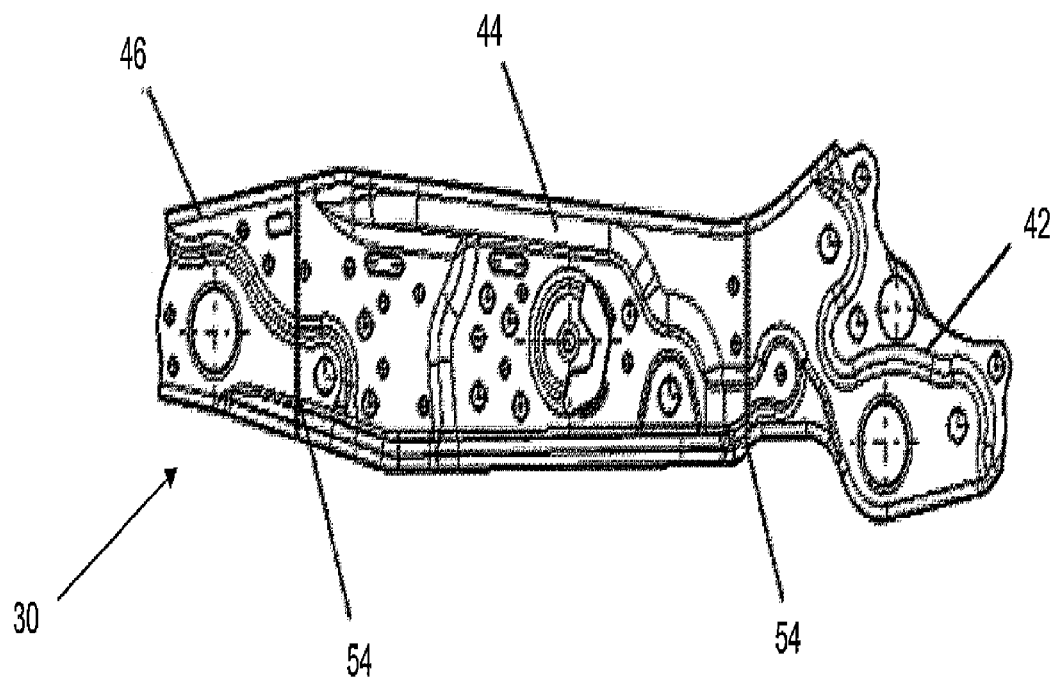
FIG. 4B is a side view of one of the side members for the seat base in FIG. 2 formed from a TWB or TWC with variable thicknesses and/or strengths.

FIGS. 4A-4B show a side member 30 of a seat base frame 18. Side members 30 or seat B-brackets are used to connect the seat back 16 to the seat track assembly 26 and to locate the cushion pan 132. During seat use, especially during loading events such as those resulting from a vehicle impact, the side member 30 (commonly known as a B-bracket) is highly loaded in a complex manner and forces can vary between compression and tension. Most of the loading in an impact is applied to the ends of the side member 30 or B-bracket. The primary load paths for the side member 30 are such that the first end 42 of the side member 30 experiences tensile loads from a RWD impact and compressive loads from a FWD impact and the second end 46 of the side member 30 experiences tensile loads from FWD impact and a recliner moment from a rear impact. Current side members are formed from a single thickness and single material type and the width of the side member is varied to compensate for the increased bending moment requirements due to the impact or for packaging requirements. As shown in FIG. 4B, the side member 30 may be formed from a TWB or TWC that is preferably stamped to form the side member 30. For load management, the section properties of the side member 30 are optimized by developing highly formed sections. For minimized weight, the vehicle component thickness is minimized to have less material or a lower density material may be used. For maximum strength, high strength metal (steel or alloy) materials are used. As such, side member 30 is designed with the minimum thickness that will meet the loading requirements at the front and rear of the side member 30. More specifically, the side member 30 or bracket includes end portions 42, 46 that are a higher strength and/or thicker metal (steel or alloy) to compensate for an increased bending moment applied to the end portions and a middle portion 44 that is a lower cost and/or thinner metal (steel or alloy) that may be selected for high formability. The high strength material (e.g., steel), highly formed sections, and minimum thickness lead to a high potential for material splitting during forming. LTW material, however, allows the placement of high strength material in critical locations for performance and more formable material where required to eliminate splitting. According to other exemplary embodiments, the side member 30 may be formed to manage other load cases (e.g., modal, fatigue, etc.).

Figure 5A:
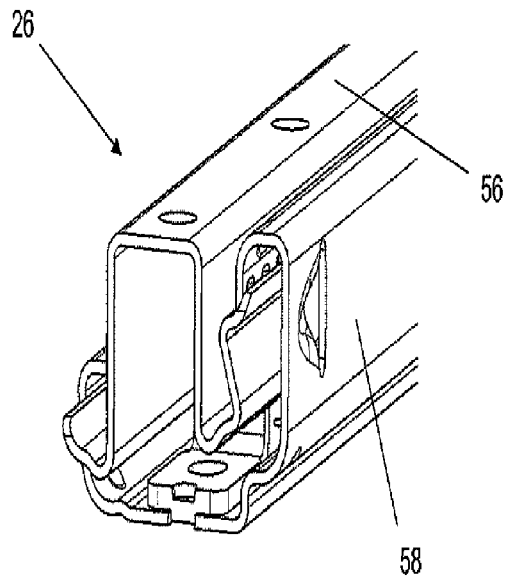
FIG. 5A is a perspective view of a seat track assembly made from a single material and single thickness.
Figure 5C:
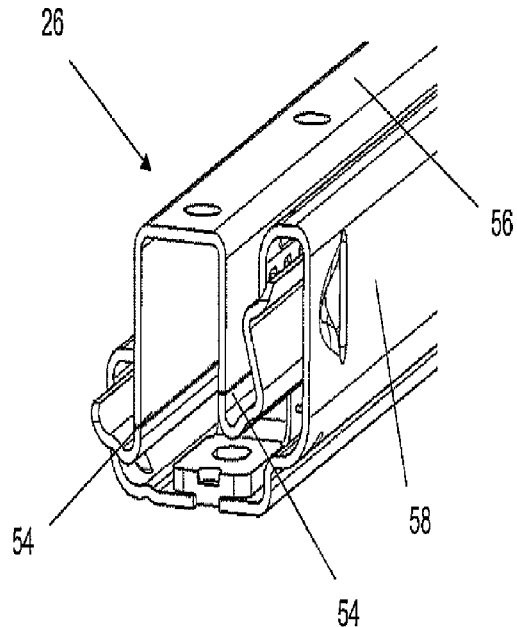
FIG. 5C is a perspective view of a seat track assembly including a member formed at least partially from a TWB or TWC with variable thicknesses and/or strengths.
Figure 5B:
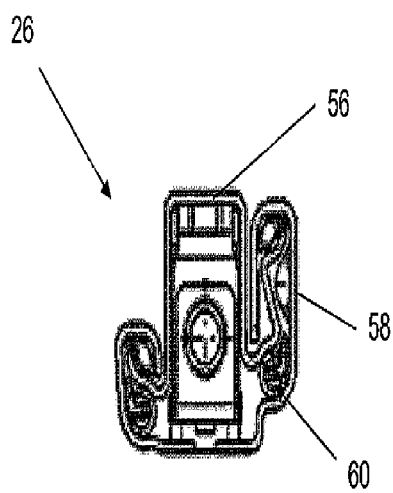
FIG. 5B is a front view of a seat track assembly made from a single material and single thickness.
Figure 5D:
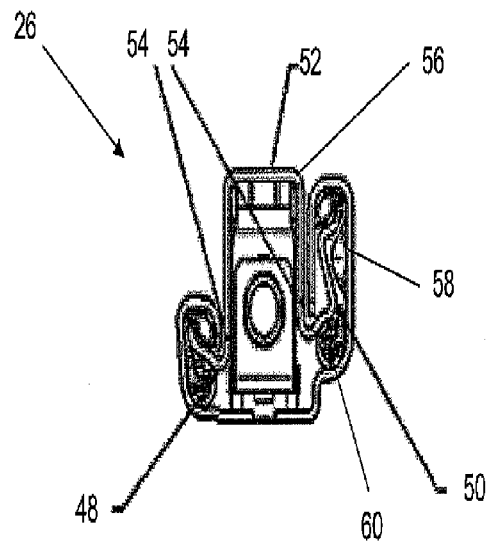
FIG. 5D is a front view of a seat track assembly including a member formed at least partially from a TWB or TWC with variable thicknesses and/or strengths.

FIGS. 5A-5B show a single material, single thickness seat track assembly 26. Seat tracks 26 are designed to allow the occupant to adjust their seat position relative to the vehicle controls. The design principle involved with the track 26 shown is to minimize the sliding efforts by controlling the spacing between the track sections. The seat track 26 includes an upper track 56 coupled to the vehicle seat 12, a lower track 58 coupled to the vehicle frame, and a multitude of ball (or roller) bearings 60 trapped between the two tracks 56, 58 (or any other known or appropriate anti-friction device). The ball bearings 60 facilitate the sliding of the upper track 56 relative to the lower track 58. The seat track efforts are determined by the amount of deflection of the rails of the seat tracks 26 caused by the interference of the ball bearings 60 when the ball bearings 60 are inserted between the upper track 56 and the lower track 58. The amount of deflection is a function of the thickness of the metal (or alloy) used to form the upper and lower tracks 56, 58. In current seat tracks, the thickness of the tracks is dictated by metal (or alloy) utilized and the loading requirements. The track efforts are also affected by the track geometry. As shown in FIGS. 5C-5D, the upper track 56 may be formed from a TWB or TWC. Interference of the track 26 sections leads to bending forces that can be used to set the amount of effort in adjustment. In order to properly set the bending forces from interferences, the thickness of the metal (steel or alloy) is preferably minimized for improved bending performance. In the sections that do not contribute to or involve bending, however, this thickness is often more than what is required for the particular application. Therefore, by selectively using thicker material only where it is required for managing the bending forces and using thinner material elsewhere, the mass of the seat section may be optimized. A reduced thickness also lends itself to the possibility of freeing up space within the center of the track 26 sections for either larger elements (e.g., transmissions) or allows the possibility of making the outer dimensions smaller while preserving the amount of space within the center of the track 26 sections. A further possibility is that the costs for the seat track 26 sections can be reduced by using less expensive metal in the locations where the bending occurs. By up-gauging, higher forces can be tolerated without having to increase the strength of the material—lower strength material is often cheaper. Yet another possibility is to use very high strength material only in the sections where interference bending occurs and use low cost material in the remainder of the section. The high strength (and high resistance to roller denting) can assist in preventing usage defects, such as dented ball bearing tracks that lead to poor adjustment feel. A further possibility is that by substituting a more formable material in the bending interference areas, the roll forming process can be optimized with tighter radii and more dimensional accuracy. With these principles in mind, FIGS. 5C-5D further show a seat track 26 according to an exemplary embodiment where the upper track 56 includes a first end portion 48, a middle portion 52, and a second end portion 52 that are coupled via join seams 54 and made of metal (or other alloy) with a thickness and/or strength that is selected to provide an improved bending performance and more closely control the track adjustment efforts.

Figures 6A, 6B:
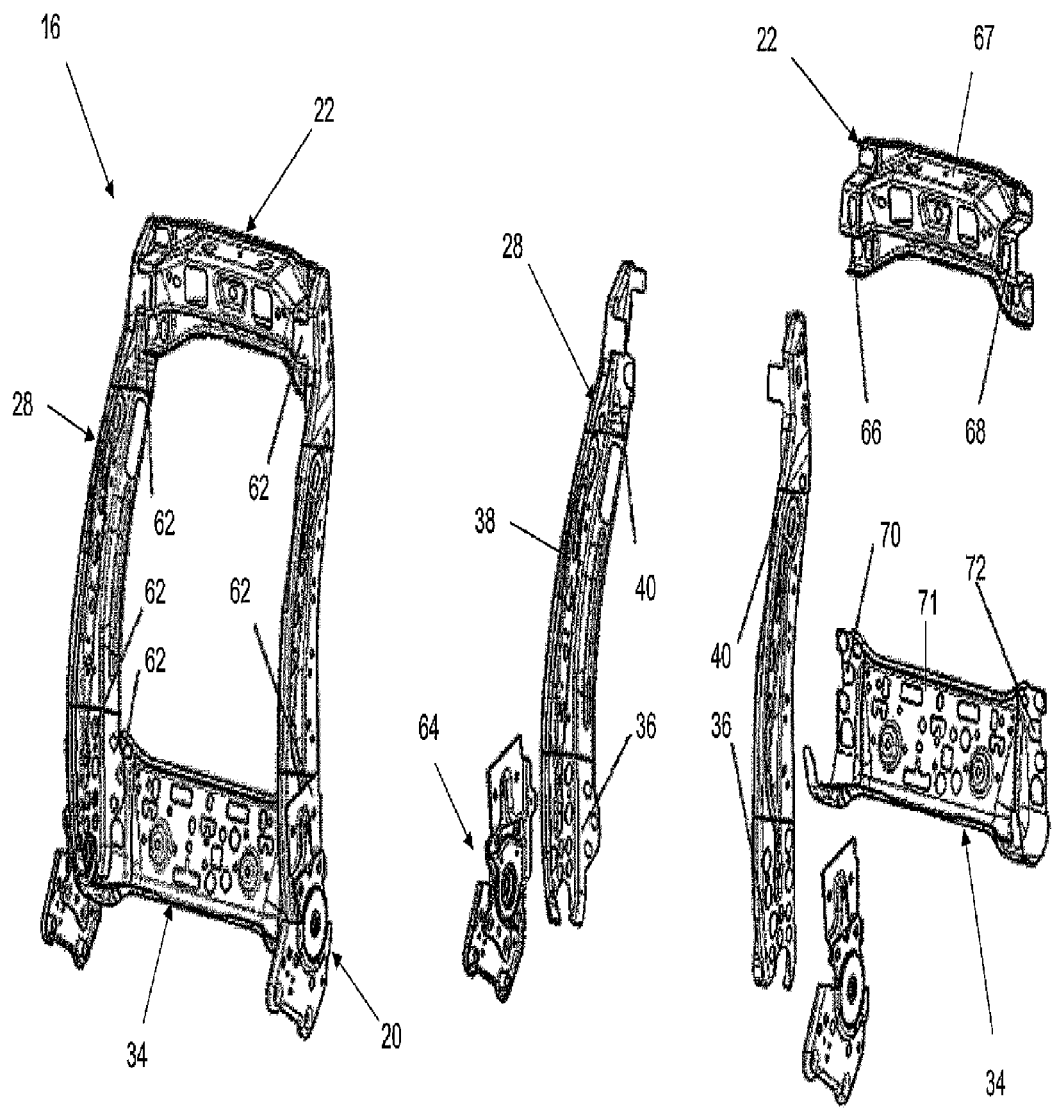
FIG. 6A is perspective view of seat back frame of FIG. 2 having several weld joints.
FIG. 6B is an exploded perspective view of the seat back frame of FIG. 2 having several weld joints.

As shown in FIGS. 6A-6B, the components of the seat back frame 16 may be at least partially assembled with weld joints 62. For instance, the recliner 20 is coupled to the seat back frame 16 with welding and the side members 28 are joined to the cross members 22, 34 by welding. According to various exemplary embodiments, the welding operation can be laser welding, spot welding, gas-metal arc welding (GMAW) or any other suitable welding process. In one particular exemplary embodiment a high energy, focused beam welding technology is used for the welding operation. In another particular exemplary embodiment a high energy, focused beam welding technology utilizing no filler material is used for the welding operation. Current side members, cross members, and recliner brackets are formed from a single thickness and grade of material. The thickness and material selection of the metal may be determined by the welding process. However, the material and thickness needed for the welding location may be greater than the material selection and thickness needed for the rest of the component, which may lead to an overdesign of the component. As shown in FIG. 6B, the components may be formed from a TWB or TWC that is stamped to form the components. These components include a pair of seat back side members 28 having a lower portion 36, middle portion 38, and an upper portion 40; upper cross member 22 having a first end portion 66, a middle portion 67, and a second end portion 68; a lower cross member 34 having a first end portion 70, a middle portion 71, and a second end portion 72; and a recliner bracket 64. The end portions of these components are made of a metal (or alloy) with a gauge and grade that facilitates the weld joint, whereas the middle portions of these components are made of a metal (steel or alloy) with a different gauge and grade. The interfaces where components are joined together must be manufactured to accommodate the selected joining process (e.g., laser welding, spot welding, GMAW, adhesives, etc.). For example, when using GMAW a gap may be allowable between components but the gap must be removed for spot welding or riveting to be successfully achieved. For GMAW, there is a minimum thickness requirement to be successful in joining materials together. The minimum thickness can drive the thickness of the component that is being joined. For example, when considering the lower cross member of the seat, the primary loads dictate that thin gauge metal (steel or alloy) is sufficient. However, the metal (steel or alloy) would then be too thin to be arc welded without causing significant burn through. By using LTW, the seat back 16 components could be locally thickened where the desired joining process is employed and thinned in the areas where the joining does not occur. Another embodiment of this approach is in the joining of dissimilar materials. Using a process known as Cold Metal Fusion, aluminum can be welded to a zinc coated steel using a process very similar to GMAW. The concern, however, is that because the steel component must be coated with a zinc layer and therefore, greatly increase cost. By using a steel TWB, TWC or TWT, however, the zinc can be used only in the areas to be welded rather than coating the entire component.

Figures 7A, 7B:
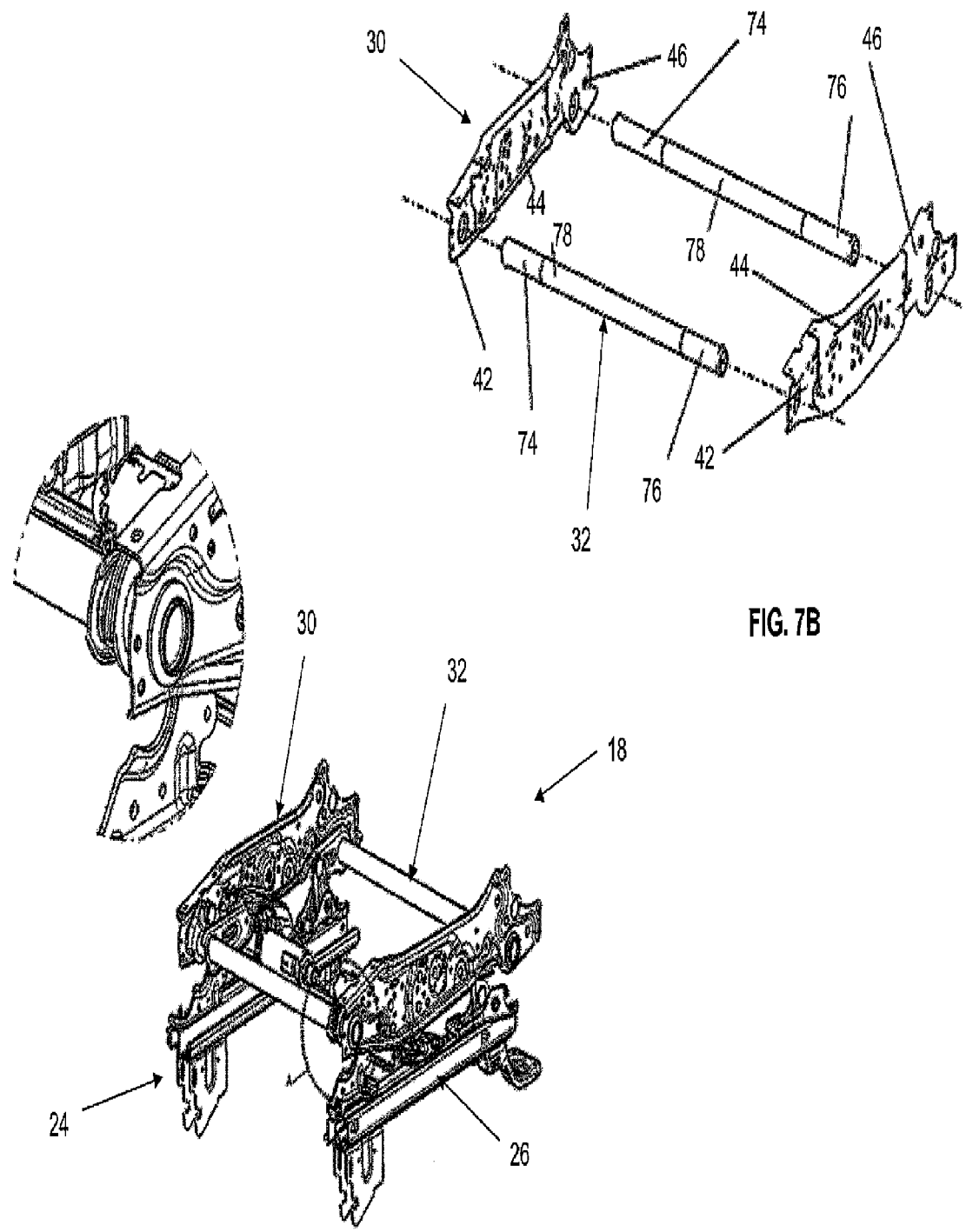
FIG. 7A is a perspective view of a portion of a seat base frame, showing side members and tube cross members and including components formed from TWBs, TWCs and/or TWTs with variable thicknesses and/or strengths.
FIG. 7B is a simplified exploded perspective view of a portion of the seat base frame, showing a side members and tube cross members and including components formed from TWBs, TWCs and/or TWTs with variable thicknesses and/or strengths.

Components of the seat frame 14 may be swaged together and coupled with an interference fit. According to one exemplary embodiment, shown in FIG. 7A-7B, a tailored tube 32 is swaged to the side member 30 of the seat base frame 18. Current side members and tubes are formed from a single thickness and grade. The thickness of the tube may be determined by the swage operation and not by the structural loading requirements. As shown in FIG. 7B, the side members 30 and tube 32 may be formed from a TWB or TWC that is stamped to form side members 30 or a TWB or TWC that is rolled to form the tube. The side members 30 include a first end portion 42, a middle portion 44, and a second end portion 46. Similarly, the tailored tube 32 includes a first end portion 74, a middle portion 78, and a second end portion 76. The end portions of the side members 30 and the tailored tube 32 are made of a high strength and/or thicker metal (steel or alloy) to accommodate the swaging operation or higher strength to withstand a higher load. The middle portions of the side members 30 and the tailored tube 32 are made of a lower cost and/or thinner metal (steel or alloy) that may be selected for high formability. The creation of a tailored tube 32 with thicker sections at the ends 74, 76 will yield a stronger expanded joint at a lower mass. The tailored tube 32 can be created either from stamping of a tailored blank, followed by welding of the seam or by orbital welding of three separate tube sections. In either case, the materials and thicknesses can be optimized for best performance at the lowest weight.

Figure 8A:
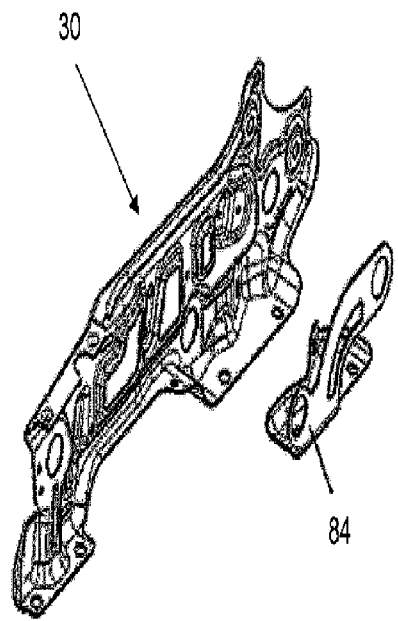
FIG. 8A is a perspective view of a seat base side member with a detached secondary bracket.
Figure 8B:
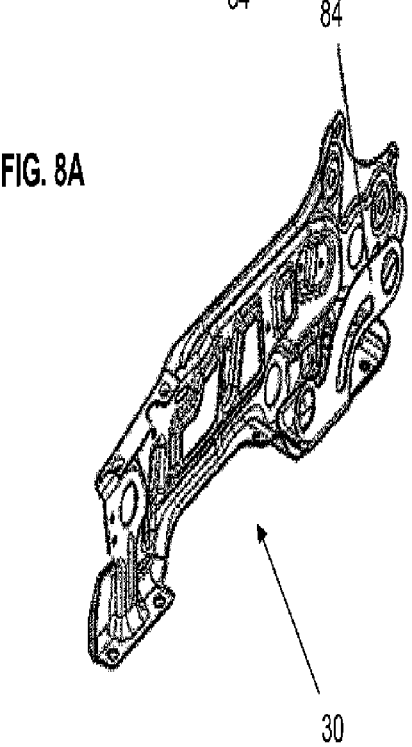
FIG. 8B is a perspective view of a seat base side member with an attached secondary bracket.
Figure 8C:
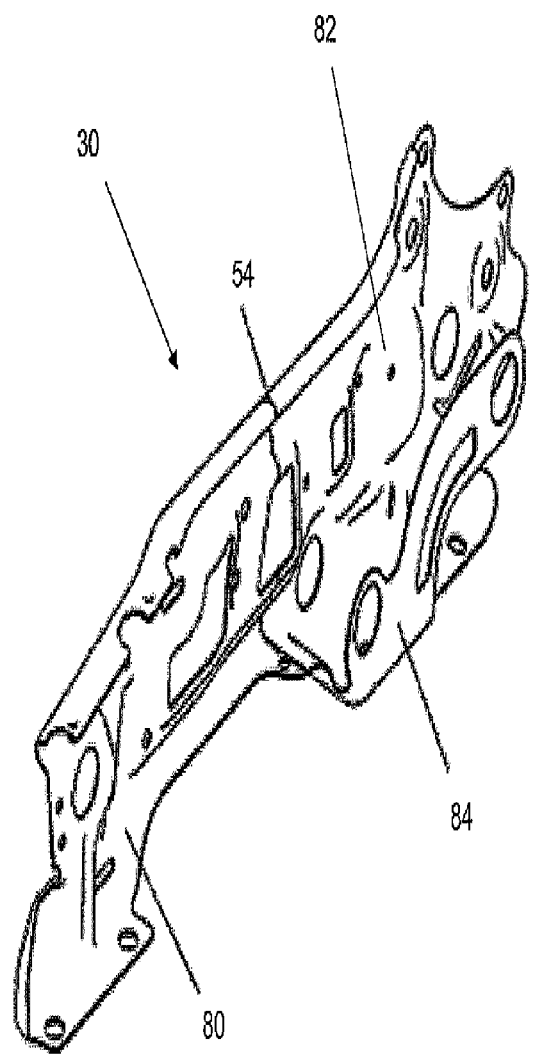
FIG. 8C is a perspective view of a seat base side member or bracket formed from a TWB or TWC having an integrally formed bracket.

TWBs may also be used to form a single seating component that can replace two or more existing components. As shown in FIGS. 8A-8B, in existing seat frames, a secondary bracket 84 may be required to compensate for additional loads on a side member 30 of the seat base frame 18. The additional component (i.e., secondary bracket 84) adds additional cost and complexity of the seat frame 14. Two or more components may be replaced by a single component formed from a TWB. According to one exemplary embodiment, as shown in FIG. 8C, the side member 30 and the secondary bracket 84 are formed as a single component with a first portion 80 that is a lower cost and/or thinner metal (steel or alloy) that may be selected for high formability and/or a lower cost material and a second portion 82 that is a higher strength and/or thicker metal (steel or alloy) to support a greater load. The first and second portions 80, 82 of the side member 30 are joined by a join seam 54.

Figure 9:
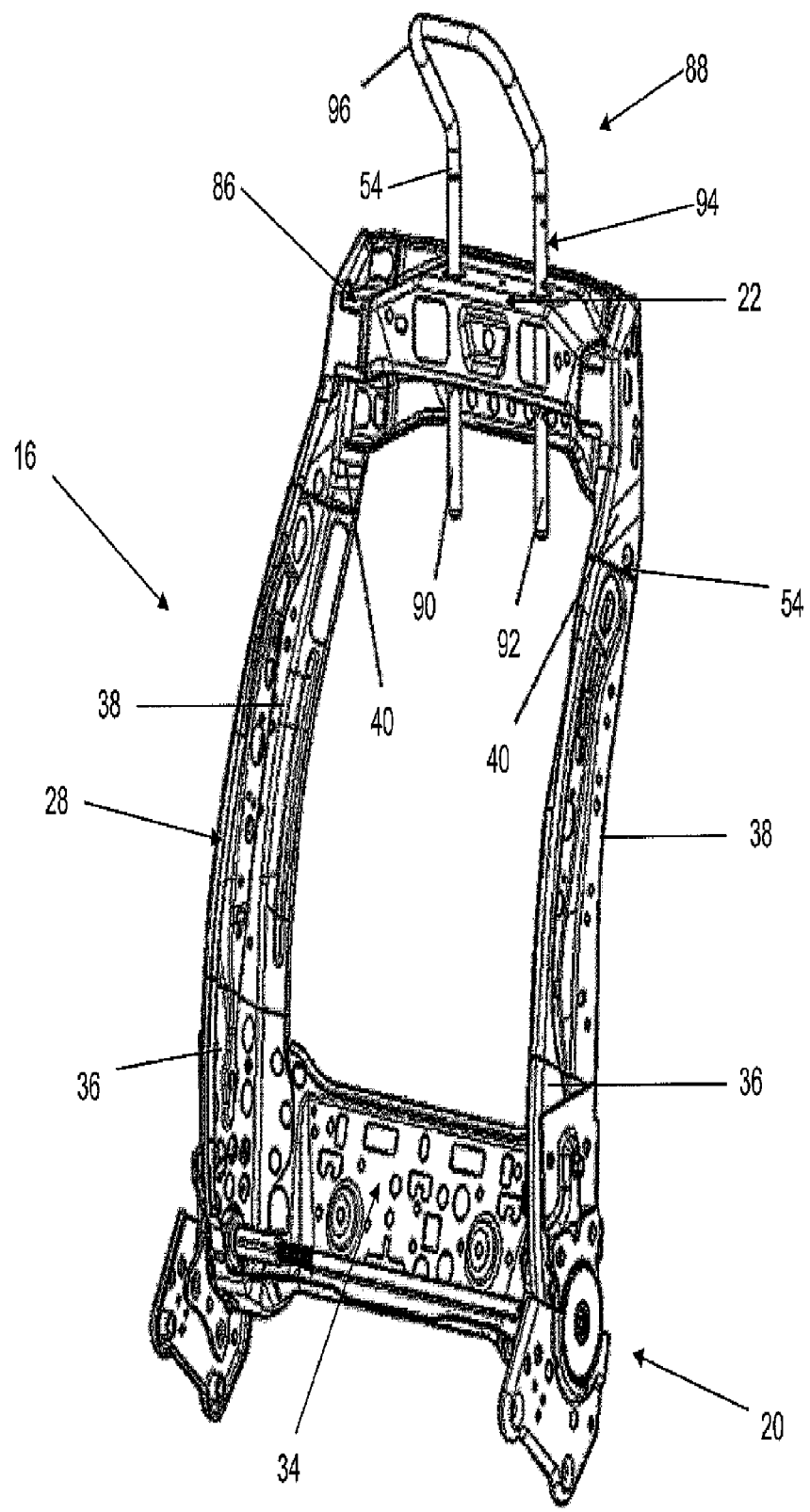
FIG. 9 is a perspective view of a seat back frame having a head restraint formed and including components formed from TWBs, TWCs and/or TWTs with variable thicknesses and/or strengths.

Referring now to FIG. 9, a head restraint frame 88 is shown coupled to the seat back frame 16. The head restraint 88 is a U-shaped body that has first and second end 90, 92 that are coupled to the seat back frame 16. The ends 90, 92 of the head restraint frame 88 may include notches that interface with a latching mechanism to selectively position the head restraint 88 relative to the seat back 16. To reduce occupant head-to-torso rotation under certain impact scenarios, it is desirable to have the seat back upper cross member 22 as torsionally stiff as possible to strengthen the head restraint 88 with respect to rearward bending loads. The joint 86 between the seat back side members 28 and upper cross member 22 is a source of weakness in this respect. Additional welds at the joint 86 between the side members 28 and upper cross member 22 would increase the strength of the joint 86 but also adds cost to the manufacturing. As shown in FIG. 9, the side members 28 and upper cross member 22 may be formed from a TWB or TWC that is stamped to form the side members 28 and upper cross member 22. The side members 28 include a lower portion 36, a middle portion 38, and an upper portion 40. The seat back upper portions 40 are made of a high strength and/or thicker metal (steel or alloy) to provide added strength near the joint 86 between the seat back side member 28 and the upper cross member 22 and to increase the torsional stiffness of the upper cross member 22.

Additionally, the head restraint frame 88 may be formed from a TWB that is rolled and bent to form the head restraint frame 88. The head restraint frame 88 may include a lower portion 94 that is made of a high strength and/or thicker metal (steel or alloy) and an upper portion 96 that is a lower cost and/or thinner metal (steel or alloy). This optimizes performance in rear impact loading conditions and improves rigidity of the head restraint 88 rods while reducing mass.

Figure 10:
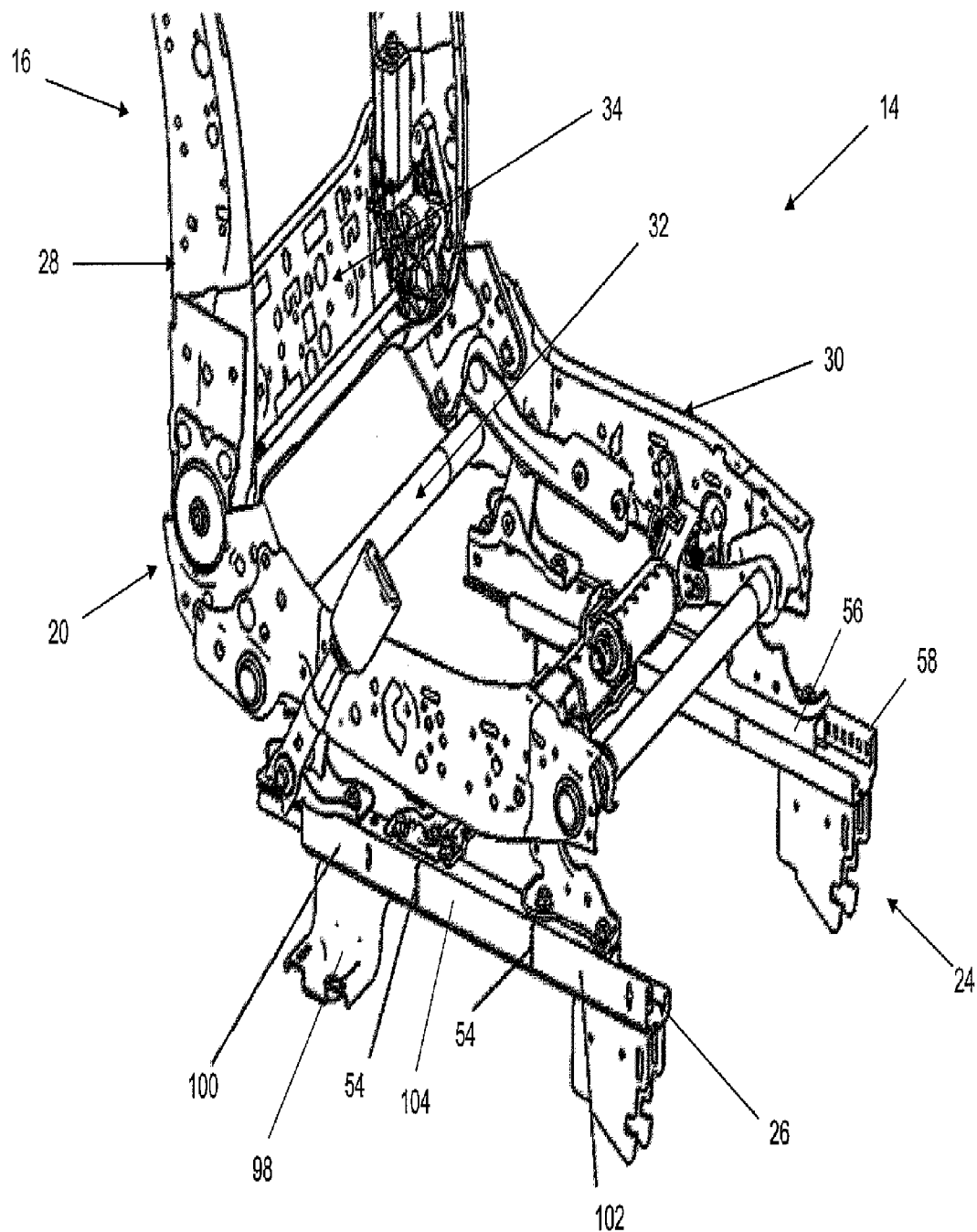
FIG. 10 is a partial perspective view of a seat frame coupled to a track assembly and including components formed from TWBs, TWCs and/or TWTs with variable thicknesses and/or strengths according to an exemplary embodiment.

Referring now to FIG. 10, a seat frame 14 with tailor welded components is shown according to another exemplary embodiment. The vehicle seat frame 14 includes a seat back 16, a seat base 18, a connection member or recliner 20 coupled to the seat back 16 and the seat base 18. The vehicle seat frame 14 further includes a pair of seat back side members 28, a pair of seat base side members 30, a tailored tube 32, a lower cross member 34, an upper cross member 22, a base portion 24, and a seat track assembly 26. As shown in FIG. 10, the seat track assembly 26 has an upper track 56 and a lower track 58. The rear of the tracks 56, 58 are usually subjected to higher loads, whereas the middle and front of the tracks are typically subjected to lower loads. The tracks may be formed from a TWB with metal (steel or alloy) of higher thickness or strength proximate to the rear and from a lower thickness or strength metal (steel or alloy) proximate to the front. As such, the upper and lower track 56, 58 may include a first end portion 100, second end portion 102, and a middle portion 104 made with varying strength and/or thickness of material. For example, the first end portion 100 may be made of thicker and/or stronger material; and the second end portion 102 and the middle portion 104 of the tracks may be made with progressively thinner/lighter material. The various portions 100, 102, 104 may be coupled (welded) together via join seams 54.

Referring now to FIGS. 11A-11C, TWBs or TWCs may be used advantageously to form other components of a bench seat frame 106 that form relatively long spans and have relatively large moment gradients, including components that support child seat LATCH wires 108 or any relatively long tube 110. The ends 112, 114 of the seat bench tube 110 typically experience higher stress and loads, whereas the middle portion 116 typically experiences lower stress and loads. As such, the bench seat tube 110 may include a first end portion 112, a second end portion 114, and a middle portion 116 wherein the end portions 112, 114 may be made of high strength and/or thick gauge material and the middle portion 116 may be made of low cost and/or thin gauge material. The various portions 112, 114, 116 may be welded together via join seams 54.

TWBs or TWCs may be joined together and used to form other components that experience high localized loads. For example, TWBs may be used to eliminate local reinforcement plates added to back panels to withstand knee and/or cargo retention loads. Referring to FIGS. 12A-12F, TWBs may also be used to form a back panel 118 that is integrated with the side members 120 or with the top and bottom cross members 122, 124, eliminating two parts from the manufacturing process and resulting vehicle component. The seat back 118 includes side members 120 that may include a first end portion 126, a second end portion 128, and a middle portion 130. The end portions 126, 128 of the side members 120 typically experience higher stress and loads, whereas the middle portion 130 typically experiences lower stress and loads. As such, the first and second end portions 126, 128 may be made of high strength and/or thick gauge material, whereas the middle portion 130 may be made of low cost and/or thin gauge material. The first end portion 126, second end portion 128, and the middle portion 130 may be welded together via join seams 54. The back panel 118 may also include a bracket frame member 119 for attaching to a seat base. The bracket frame member 119 may include an upper portion 121, a middle portion 123, and a lower portion 125. The middle and lower portion 121, 125 of the bracket frame member 119 experience higher stress and loads, whereas the upper portion 123 of the bracket frame member 119 typically experiences lower stress and loads. As such, the middle and lower portions 121, 125 may be made of high strength and/or thick gauge material, whereas the upper portion 123 may be made of low cost and/or thin gauge material. The upper portion 121, middle portion 123, and lower portion 125 may be manufactured together via join seams 54 by using a TWB or TWC prior to manufacturing the bracket frame member 119 vehicle component.

Figures 12D, 12E, 12F:
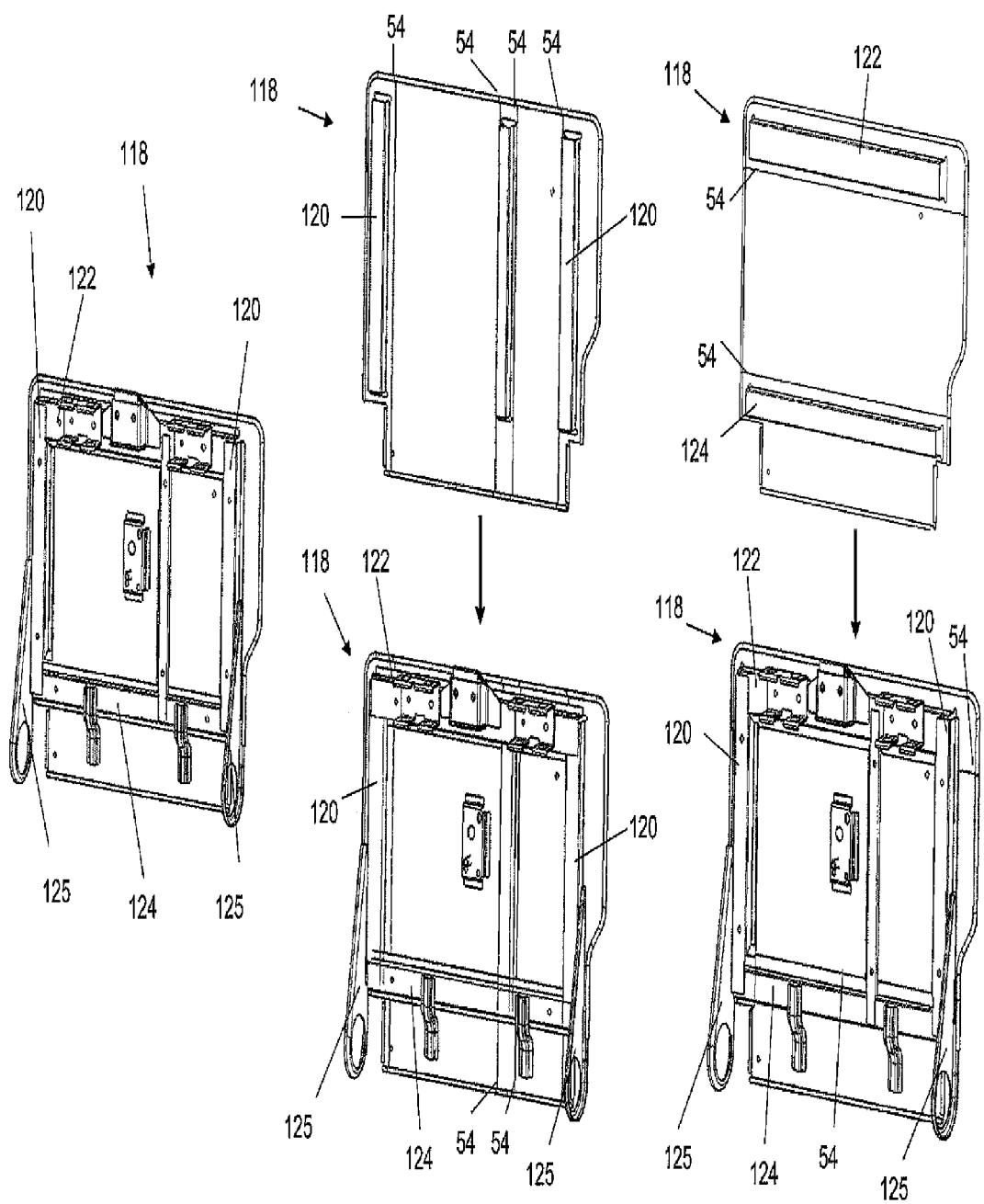
FIG. 12D is a perspective view of a back panel with separate vertical and horizontal beams.
FIG. 12E is a perspective view of a back panel formed from TWBs or TWCs with integrated vertical beams.
FIG. 12F is a perspective view of a back panel formed from TWBs or TWCs with integrated horizontal beams.

The back panel 118 of FIGS. 12A, 12B and 12C is shown as including a flat panel member 118 that is made of single material having a single thickness and single set of properties. It is possible to form the back panel as a TWB and/or TWC by coupling together multiple portions of varying materials and thicknesses into flat panel member of the back panel 118 via vertical join seams 54 prior to the integrated (unitary) vertical members 120 being formed as shown in FIG. 12E. In an alternative exemplary embodiment, it is possible to manufacture the flat panel member of the back panel 188 using a TWB and/or a TWC to and to then manufacture the flat panel member into the vehicle component of the back panel 188 in a forming operation (such as stamping or progressive stamping processes) or other appropriate process to form the integrated (unitary) horizontal cross members 122, 124 in the respective portions of the flat panel member of the back panel 118 as shown in FIG. 12F. In both FIGS. 12E and 12F it is shown that the flat panel member of the back panel 118 is first manufactured and then the other components of the back panel member are added.

Figures 13A, 13B:
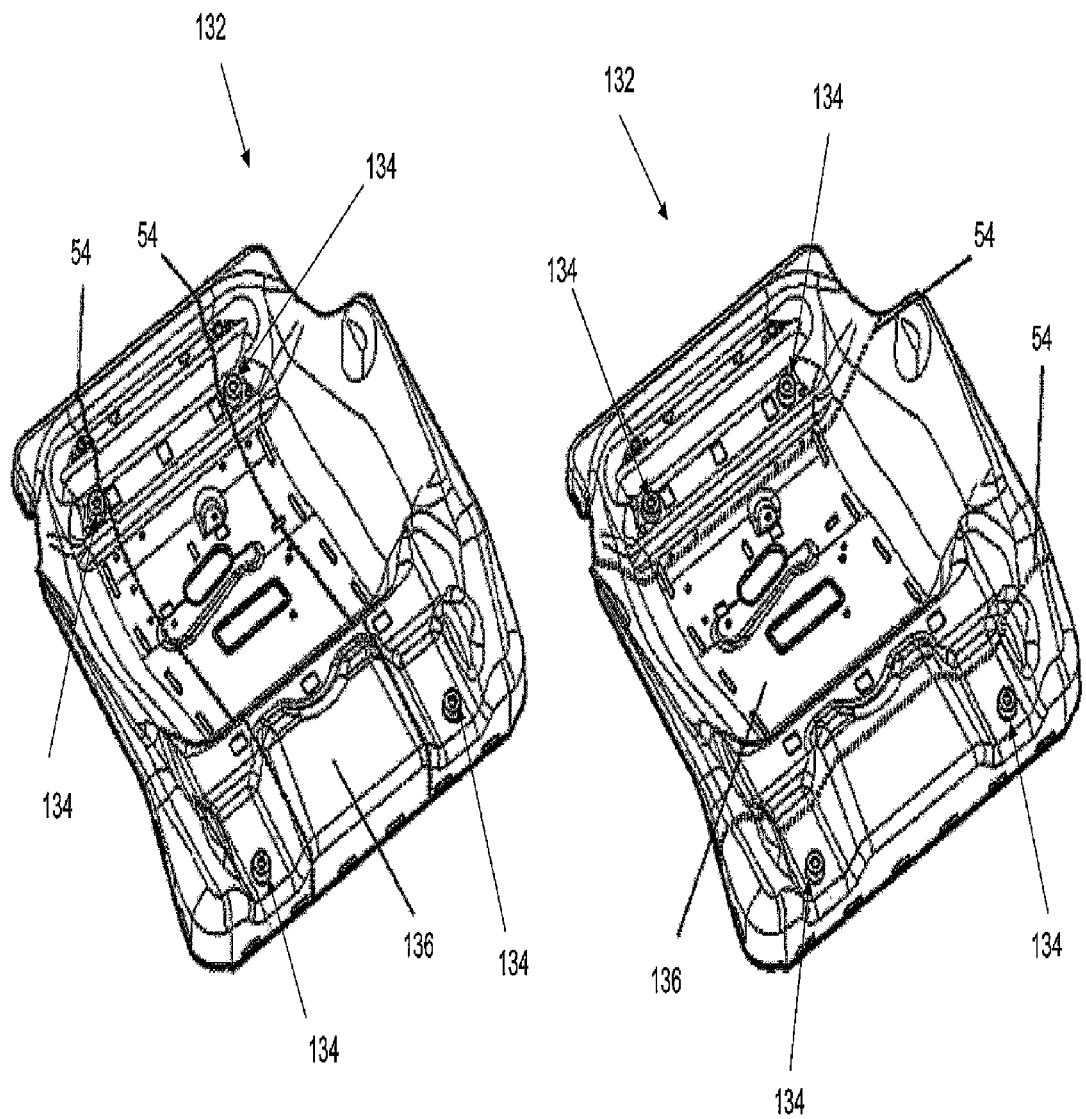
FIG. 13A is a perspective view of a cushion pan formed at least partially from a TWB or TWC with variable thicknesses and/or strengths according to an exemplary embodiment.
FIG. 13B is perspective view of a cushion pan formed at least partially from a TWB or TWC with variable thicknesses and/or strengths according to another exemplary embodiment.

TWBs or TWCs may be used to alter the performance of seat components to enhance the ability to manufacture the part as well as to improve the performance and durability of the part during use. Referring to FIGS. 13A-13B, an exemplary cushion pan 132 is shown that requires a deep draw to achieve the desired shape. The metal (steel or alloy) selection for the part is generally made based upon the forming requirements. The highly formable (draw quality) metal (steel or alloy) has low strength in order to achieve high formability. The low strength requires an increase in the thickness of the metal (steel or alloy) to achieve satisfactory performance in locations that are highly stressed. A tailor welded metal (steel or alloy) structure can provide thicker and/or higher strength material where stresses are higher (such as the raised bosses 134) and/or fatigue issues arise and provide a thinner, highly formable metal (steel or alloy) where it is required (such as in the middle of the pan 134 where fatigue and durability is less of a concern). The various portions (e.g., middle portion 136) of the cushion pan 132 may be welded together via join seams 54.

While the above descriptions have generally dealt with tailor welded metal (steel or alloy) components, it should be understood that the metal used to form the seat frame and other components is not limited to metal (steel or alloy). According to other exemplary embodiments, the seat frame and other components may be formed from aluminum, or any other suitable metal or alloy.

For purposes of this disclosure, the term "coupled" (in all of its forms, couple, coupling, coupled, etc.) means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components or the two components and any additional member being attached to one another. Such joining may be permanent in nature or alternatively may be removable or releasable in nature.

The foregoing description of embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were shown and described in order to explain the principals of the invention and its practical application to enable one skilled in the art to utilize the invention in various embodiments and with various modifications as are suited to the particular use contemplated.

It is also important to note that the construction and arrangement of the elements of the vehicle seat as shown in the preferred and other exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures and combinations. Accordingly, all such modifications are intended to be included within the scope of the present innovations. Other substitutions, modifications, changes and omissions may be made in the design, operating conditions and arrangement of the preferred and other exemplary embodiments without departing from the spirit of the present innovations.

What is claimed is:

1. A vehicle seat having a stamped tailored metal seat back frame side member component, comprising:
   at least two portions;
   a first portion having a length and opposing ends said first portion having edges along said length and ends;
   said first portion composed of a first metal material, having at least one of a first material grade, first thickness or first material strength;
   a second portion having a length and opposing ends; said second portion having edges along said length and ends;
   said second portion composed of a second metal material having at least one of a second material grade, second thickness or second material strength;
   wherein at least one of said first material, first material grade, first thickness or first material strength is different from at least one of said, second material grade, said second thickness or said second material strength; and
   said first portion and said second portion joined along at least one respective edge of each other
   said first portion first material strength is greater than the second material strength of said second portion and said first portion is located proximal to a vehicle seat back pivot.

2. A vehicle seat having a stamped tailored metal seat back frame side member component, comprising:
   at least two portions;
   a first portion having a length and opposing ends said first portion having edges along said length and ends;
   said first portion composed of a first metal material, having at least one of a first material grade, first thickness or first material strength;
   a second portion having a length and opposing ends; said second portion having edges along said length and ends;
   said second portion composed of a second metal material having at least one of a second material grade, second thickness or second material strength;
   wherein at least one of said first material, first material grade, first thickness or first material strength is different from at least one of said, second material grade, said second thickness or said second material strength; and
   said first portion and said second portion joined along at least one respective edge of each other, wherein the first material grade is different than said second material grade, said first portion material grade more formable than said second portion material grade.

3. The vehicle seat of claim 2, further comprising a frame side member having a first thickness, the lower portion for connecting to a second component; a middle portion having a second thickness; and
   a top portion having a third thickness, the top portion for connecting to a third component.

4. The vehicle seat of claim 3, wherein at least one of the second component or third component is made of aluminum.

5. The vehicle seat of claim 4, wherein at least one of the lower portion or the top portion is comprised of steel coated with zinc.

* * * * *